US008095668B2

(12) United States Patent
Mitchell et al.

(10) Patent No.: US 8,095,668 B2
(45) Date of Patent: Jan. 10, 2012

(54) MIDDLEBOX CONTROL

(75) Inventors: Julian Mitchell, Maidenhead (GB); David J Tubb, Maidenhead (GB); Mark Watson, London (GB)

(73) Assignee: Rockstar Bidco LP, New York, NY (US)

( * ) Notice: Subject to any disclaimer, the term of this patent is extended or adjusted under 35 U.S.C. 154(b) by 1969 days.

(21) Appl. No.: 10/037,043

(22) Filed: Nov. 9, 2001

(65) Prior Publication Data

US 2003/0093481 A1    May 15, 2003

(51) Int. Cl.
    *G06F 15/16* (2006.01)
(52) U.S. Cl. ..... 709/228; 709/245; 709/249; 370/395.2; 370/401
(58) Field of Classification Search .................. 709/245, 709/227, 228, 249; 370/352, 389, 395.2, 370/401
    See application file for complete search history.

(56) References Cited

U.S. PATENT DOCUMENTS

| | | | | |
|---|---|---|---|---|
| 6,058,431 A | * | 5/2000 | Srisuresh et al. | 709/245 |
| 6,381,638 B1 | * | 4/2002 | Mahler et al. | 709/220 |
| 6,661,799 B1 | * | 12/2003 | Molitor | 370/401 |
| 6,822,957 B1 | * | 11/2004 | Schuster et al. | 370/389 |
| 6,996,628 B2 | * | 2/2006 | Keane et al. | 709/238 |
| 2002/0085561 A1 | * | 7/2002 | Choi et al. | 370/392 |
| 2002/0114322 A1 | * | 8/2002 | Xu et al. | 370/352 |
| 2002/0152325 A1 | * | 10/2002 | Elgebaly et al. | 709/246 |
| 2003/0009561 A1 | * | 1/2003 | Sollee | 709/227 |
| 2003/0055978 A1 | * | 3/2003 | Collins | 709/227 |
| 2004/0252683 A1 | * | 12/2004 | Kennedy et al. | 370/389 |
| 2005/0125532 A1 | * | 6/2005 | Kimchi | 709/225 |

OTHER PUBLICATIONS

Huitema, MIDCOM Scenarios, IETF Working Document, May 17, 2001.*
Srisuresh,'MIDCOM Architecture and Framework', IETF Working Document, Feb. 2001.*
Handley, 'RFC2327 SDP : Session Description Protocol', IETF.*
Anquetil L-P et al: "Media Gateway Control Protocol and Voice over IP Gateways. MGCP and VOIP Gateways will offer Seamless Interworking of New VOIP Networks with Today's Telephone Networks" Electrical Communication, Alcatel. Brussels, BE, Apr. 1, 1999, pp. 151-157, XP000830045, ISSN: 0013-4252.
Rosenberg J et al: Getting SIP Through Firewalls and NATs RFC, Feb. 22, 2000, pp. 1-26, XP002167710, retrieved from the internet: URL:http://www.softarmor.com/sipwg/draft-rosenberg-sip-firewalls-00.txt, retrieved on May 18, 2001.
Schulzrinne H et al: "Signaling for Internet Telephony" Network Protocols, 1998. Proceedings. Sixth International Conference on Austin, TX, USA, Oct. 13-16, 1998, Los Alamitos, CA, USA, IEEE Comput. Soc, US, Oct. 13, 1998, pp. 298-307, XP010309377.

(Continued)

*Primary Examiner* — Greg C Bengzon
(74) *Attorney, Agent, or Firm* — Barnes & Thornburg LLP

(57) ABSTRACT

In order to carry out actions such as setting up a call from an entity in the address realm of one middlebox to an entity in the address realm of another middlebox, then a middlebox control node such as a call server is used. Previously, the middlebox control node has needed to have pre-configured information about all the middleboxes and which address realms they are associated with. The present invention provides one or more middlebox-identity-providing nodes which are separate from the middlebox control node, and which are more directly connected to the end users of the service than the middlebox control node. This provides greater flexibility in network design and removes the need for middlebox information to be pre-configured at the middlebox control node. Instead, this information is sent to the middlebox control node, as part of signalling messages, from middlebox-identity-providing nodes.

26 Claims, 8 Drawing Sheets

OTHER PUBLICATIONS

Handley M et al: "SDP: Session Description Protocol" RFC, Apr. 1998, pp. 1-36 XP002101463, retrieved from the internet URL:http://www.cis.ohio-state-edu/htbin/rfc/rfc2327.html retrieved on Apr. 28, 1999.

MIDCOM Working Group Internet Draft—'Potential Solutions to the Middle Box Discovery Problem'—Author: C. Aoun, Dated: Nov. 14, 2001.

"Middlebox Communication Architecture and Framework"—Internet Draft, Network Working Group—Memo dated Oct. 4, 2001 (30 pages).

"MIDCOM Scenarios"—Internet Draft—Memo dated May 17, 2001 (16 pages).

"Middlebox Control (MIDCOM) Protocol Architecture and Requirements" Internet Draft—MIDCOM Working Group—Memo cated Jul. 2000 (13 pages).

* cited by examiner

MIDDLEBOX CONTROL

FIELD OF THE INVENTION

The present invention relates to a method of controlling one of a plurality of middleboxes in a communications network.

BACKGROUND TO THE INVENTION

A middlebox is a node in a communications network that is connected between two address realms in that communications network. An address realm is a region of the communications network in which each of the entities within that region have an address or identifier which is unique within that region and which is allocated according to a particular method. The term "address domain" is also used to refer to an address realm.

An example of a middlebox is a network address translator (NAT) which converts the unique addresses of one address realm into those of another address domain. Another example is a firewall which provides a secure connection between the two address realms and a further example is a quality of service regulation device which operates between the two address realms. Thus a middlebox is typically associated with a single address realm which it connects to one or more other address realms.

In order to carry out actions such as setting up a call from an entity in the address realm of one middlebox to an entity in the address realm of another middlebox, then a middlebox control node such as a call server is used. Previously, the middlebox control node has needed to have information about all the middleboxes and which address realms they are associated with. The middlebox control node is then able to use this information to control the particular middleboxes.

The information is typically pre-configured in the middlebox control node. However this method is disadvantageous. For example, if the information is pre-configured it is difficult to make changes to the middlebox locations or to add middleboxes without the need for the information at the middlebox control node to be updated. Also, if the middlebox information is statically configured it is not possible to cope with situations where different middleboxes are used depending on middlebox status, loading or call destination for example. The method is inflexible and unable to cope satisfactorily with situations in which the same user is connected to different middleboxes at different times (e.g. a mobile user).

Another method that has been considered involves using the source addresses of call signalling packets received at the middlebox control node from the middleboxes. These source addresses provide details of the middlebox addresses. However, this method does not work in situations where there are devices in the path between the middlebox and the middlebox control node. In addition, this method assumes that the same middlebox should be used for call signalling messages as for user messages (media). Also, this method requires additional datafill at the middlebox control node in order to map the middlebox source address to a middlebox control node address.

An object of the present invention is to provide a method of controlling a middlebox which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided a method of controlling one of a plurality of middleboxes in a communications network, each of the middleboxes being connected to a plurality of entities in an address realm of the communications network, said method comprising the steps of:

receiving a control message at a middlebox-identity-providing node in the communications network, said control message comprising information about one of the entities in the communications network;

using the middlebox identity providing node to determine the identity of a first middlebox connected to said one entity;

sending said identity to a middlebox control node in the communications network in order to control said first middlebox;

and wherein the middlebox-identity-providing node is separate from the middlebox control node and is more directly connected to said one of the entities than the middlebox control node.

For example, the middleboxes may be network address translators and the control message may be a call set-up request message containing information about a user terminal which originated the call set-up request. The middlebox control node may be a call server which provides a service to the entities in the address realm which are preferably user terminals in an enterprise network. By sending the identity information to the middlebox control node in this way, the advantage is achieved that the middlebox control node does not need to have pre-configured information about middlebox identities. The middlebox control node does not need to maintain a list of all the client (e.g. user terminal) to middlebox relations. Also, greater flexibility in network design with regard to the number and location of middle boxes is possible.

Preferably said identity is added to a control message which is sent to the middlebox control node. This provides a simple and effective means in which the identity information can be sent to the middlebox control node. Other information can also be added in addition to the identity information. For example, some middleboxes can have additional properties such as being split into virtual middleboxes. Knowledge of these additional properties can also be added to the control message.

In a preferred example, the control message is a session description protocol (SDP) message and the middlebox identity is added to that message using a pre-specified SDP attribute. SDP is defined in the Internet Engineering Task Force (IETF) Request for Comments (RFC) number 2327 of April 1998. However, this is not essential. Other methods can be used, such as adding the identity information to the control message in an internet protocol (IP) header.

In one embodiment the control message is a call set-up message and said method is arranged to control said first middlebox in order to set-up a call from said one entity to another entity connected to a second middlebox in the communications network. This is described in detail below with reference to FIG. 2 for example where the two entities are user terminals A and B. Preferably the second middlebox is connected to a plurality of entities in a second address realm different from the first address realm of the entities connected to the first middlebox. For example, user terminal B is in address realm D2 which is different from address realm D1 of user terminal A. The middlebox control node is then within a third address realm different from the first and second address realms. For example, in FIG. 2, the middlebox control node is a call server in address realm D3. That call server can for example, provide a service to entities in address realms D1 and D2 which could be enterprise networks.

According to another aspect of the present invention there is provided a communications network comprising:

a plurality of middleboxes, each connected to a plurality of entities in an address realm of the communications network;

a middlebox-identity-providing node arranged to receive a control message comprising information about one of the entities and to determine the identity of a first middlebox connected to said one entity;

a middlebox control node arranged to receive the determined identity of the first middlebox in order to control said first middlebox; said middlebox-identity-providing node being separate from the middlebox control node and being more directly connected to said one of the entities than the middlebox control node.

According to another aspect of the invention there is provided a signal comprising a session description protocol message comprising an attribute containing information about the identity of a middlebox. This provides a simple and effective means to send such information to a middlebox control node.

According to another aspect of the present invention there is provided a middlebox control node arranged to control a plurality of middleboxes in a communications network, said middlebox control node comprising:

an input arranged to receive a control message comprising information about the identity of one of the middleboxes;

a processor arranged to issue messages to the identified middlebox in order to control it; such that in use the middlebox control node is able to control the identified middlebox without the need to maintain its own store of information about the identities of the middleboxes and without the need to maintain its own discovery mechanism to discover the identities of the middleboxes.

A computer program for controlling such a middlebox control node is also provided using any suitable programming language as is known in the art. For example, the middlebox control node may be any suitable type of call server such as a communications server as available from Nortel Networks. Preferably the middlebox control node uses the MIDCOM protocol (see below) for controlling middleboxes.

According to another aspect of the present invention there is provided a middlebox-identity-providing node for use in a communications network comprising a plurality of middleboxes, said middlebox identity providing node comprising:

an input arranged to receive a control message comprising information about one of a plurality of entities in the communications network;

a processor arranged to determine the identity of a first middlebox connected to said one entity;

an output arranged to send said identity to a middlebox control node in the communications network; and wherein said middlebox-identity-providing node is arranged to be more directly connected to said one of the entities than the middlebox control node.

If we consider the middlebox control node as a call server which provides a service to clients such as user terminals (e.g. terminals A and B in FIG. 2) then the middlebox-identity-providing node can be any node on the path between the client and server through which the control messages pass. For example, a middlebox itself may be used as the middlebox-identity-providing node. This embodiment is particularly advantageous in the case that the middlebox is the only node to know which middlebox the client is assigned to. For example, this may occur when the client is dynamically assigned to a particular middlebox.

A computer program for controlling such a middlebox-identity-providing node is also provided using any suitable computer programming language as is known in the art.

A particular advantage of the present invention is that it allows a Business services channel manager (as commercially available from Nortel Networks) to be integrated into a communication server 2000 network (as commercially available from Nortel Networks) where that network includes MIDCOM-controlled NAT middleboxes.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
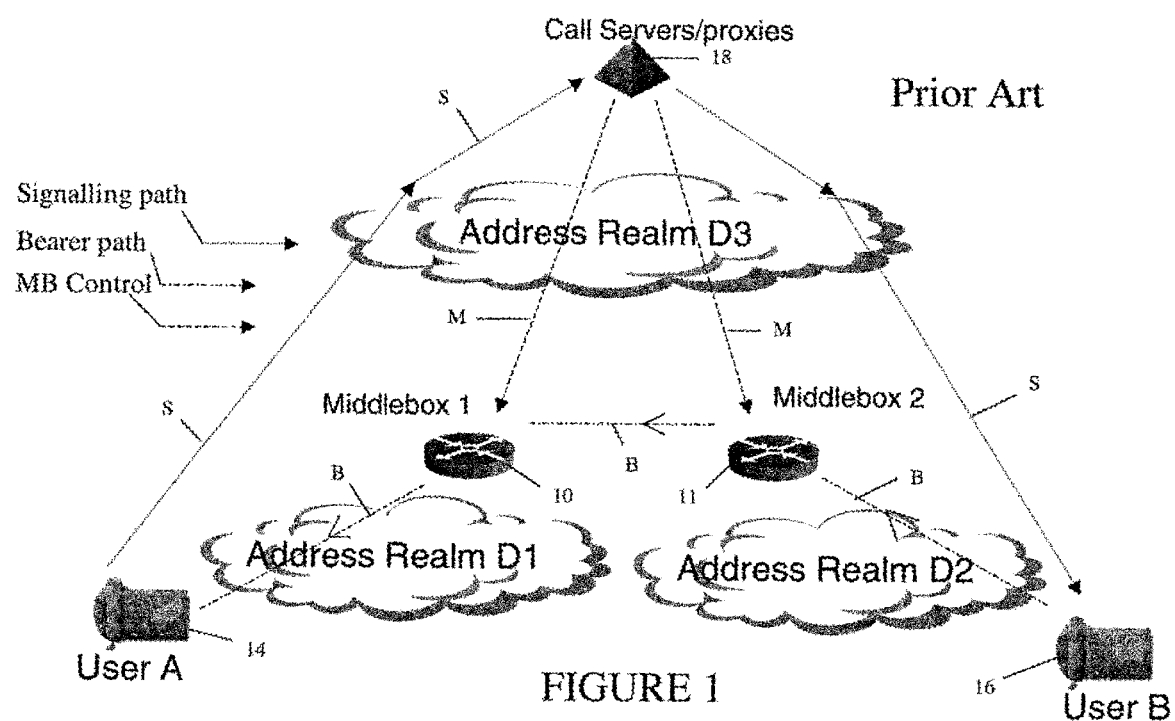
FIG. 1 is a schematic diagram of a communications network with middleboxes according to the prior art.

FIG. 1 is a schematic diagram of a communications network according to the prior art comprising two middleboxes 10, 11 and three address realms D1, D2, D3. Middlebox 1 is connected between address realm D1 and address realm D3 whilst middlebox 2 is connected between address realms D2 and D3. Each address realm contains a plurality of network nodes or entities connected together and this is represented in FIG. 1 using "cloud" shapes. Some of those network nodes are user terminals such as user terminal A, 14 in address realm D1 and user terminal B, 16 in address realm D2. Also, in address realm D3, one of the network nodes is a call server or proxy 18.

The communications network of FIG. 1 may be a voice over internet protocol (VOIP) network, a voice over asynchronous transfer mode (ATM) communications network or other suitable type of network. When a call is set up between user terminal A and user terminal B, call signalling occurs between those two terminals 14, 16. This also applies when the call involves other media such as video or data instead of or in addition to voice. This call signalling follows the path indicated by the arrow labelled S in FIG. 1. As a result of this call signalling, in an internet protocol (IP) network, a media or bearer path is set up in the reverse direction from user terminal B to user terminal A as indicated by arrows B in FIG. 1. This process is repeated in the other direction such that a media path from the originating party (in this case user terminal A) to the destination party (in this case user terminal B) is also set up. In an ATM network, after the initial call signalling, further signalling occurs as a result of which a bi-directional media path is set up between the parties.

As shown in FIG. 1, the media path travels via middleboxes 1 and 2 and this is required because those middleboxes are arranged to perform one or more tasks associated with the connections between the different address realms. For example, the middleboxes could be firewalls, network address translators (NATs) or quality of service control devices. The call server 18 is used to control the middleboxes as indicated by arrows M in FIG. 1. For example consider the situation in which a call is to be set-up between user terminal A and user terminal B, and the middleboxes 1 and 2 are NATs. In this case, assume that the address realms D1 and D2 are private whilst address realm D3 is public. For example address realm D1 may be the communications network of a particular enterprise and that of D2 the network of another enterprise. The term "public" is used here in a special sense to indicate that entities within D1 and D2 are able to route to the entities in D3 because the addresses of D3 entities are available to D1 and D2 entities "publicly". However, address realms D1 and D2 are not public with respect to address realm D3. That is, entities in realm D3 cannot simply route to entities in D1 or D2 because the addresses of D1 and D2 entities are not directly available to D3 entities. In this way there is an asymmetry in the connections between address realms D3 and D1 or D3 and D2. A service provider may offer a voice or multimedia service to the enterprises of D1 and D2 and do this using the call server 18 connected to address realm D3. The voice or multimedia service is referred to as being hosted outside the enterprise networks to which the service is offered.

Figure 2:
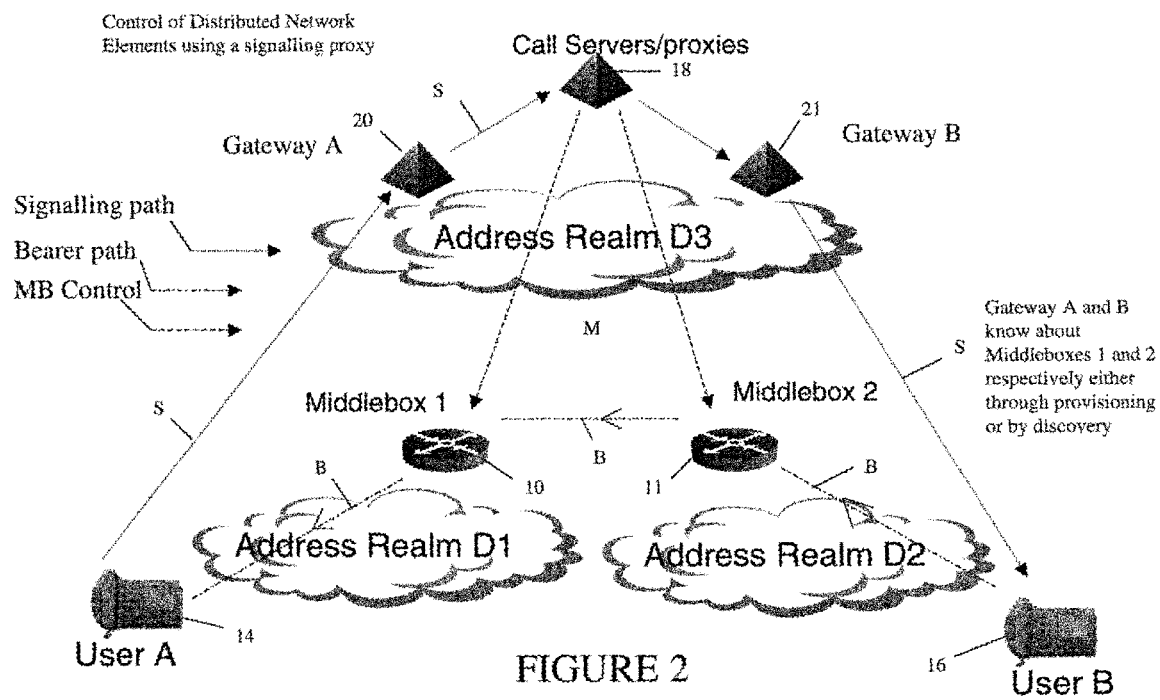
FIG. 2 is a schematic diagram of a communications network with gateways that provide middlebox-identity-providing functionality.

In order for a media path to be set up, the NATs need to set up address bindings and the call server is used to request those bindings from the NATs as indicated in FIG. 2.

These address bindings are required in order to enable the media path to be routed from middlebox 2 to a part of middlebox 1 which is in D3 and from that D3 public location to D1 which is a private address realm. In other cases, in which the middleboxes are firewalls or quality of service devices, it is also necessary for the middleboxes to be controlled in order to complete the required task such as setting up a call or allowing non-call related data paths to be established, for example, for auditing. This control has previously been achieved by issuing control or signalling messages from the call server 18, or other middlebox control node, to the middleboxes 10, 11. In order to do this, the call server 18 or other middlebox control node needs to know about the existence and location of each middlebox and which address realms those middleboxes are connected to. Previously, this middlebox information has been pre-configured in the call server 18 or middlebox control node and this is problematic for the reasons explained above.

Another problem concerns the location of the middlebox control node in relation to the user terminals A, B. If the communications network is considered as comprising layers of address realms, the middlebox control node has previously been located in a higher layer than the user terminals of the subscribers to the service in the enterprise networks. The present invention lies in recognising this problem and realising that inflexibility in network design results. For example, the ability to change based on loading or availability of middleboxes is more restricted as a result.

The present invention addresses these problems by providing one or more middlebox-identity-providing nodes which are separate from the middlebox control node, and which are more directly connected to the end users of the service than the middlebox control node. Effectively, some of the tasks of the middlebox control node are devolved to other network nodes which are located closer to the end users or clients. This provides greater flexibility in network design and removes the need for middlebox information to be pre-configured at the middlebox control node. Instead, this information is sent to the middlebox control node, as part of signalling messages, from other network nodes which are referred to herein as middlebox-identity-providing nodes.

These middlebox-identity-providing nodes may be located at any suitable position in the communications network and for example may be incorporated in gateway nodes in the same address realm as the call server, in the middlebox themselves, or in the user terminals themselves. These examples are discussed in detail below with respect to FIGS. 2 to 7.

Figure 8:
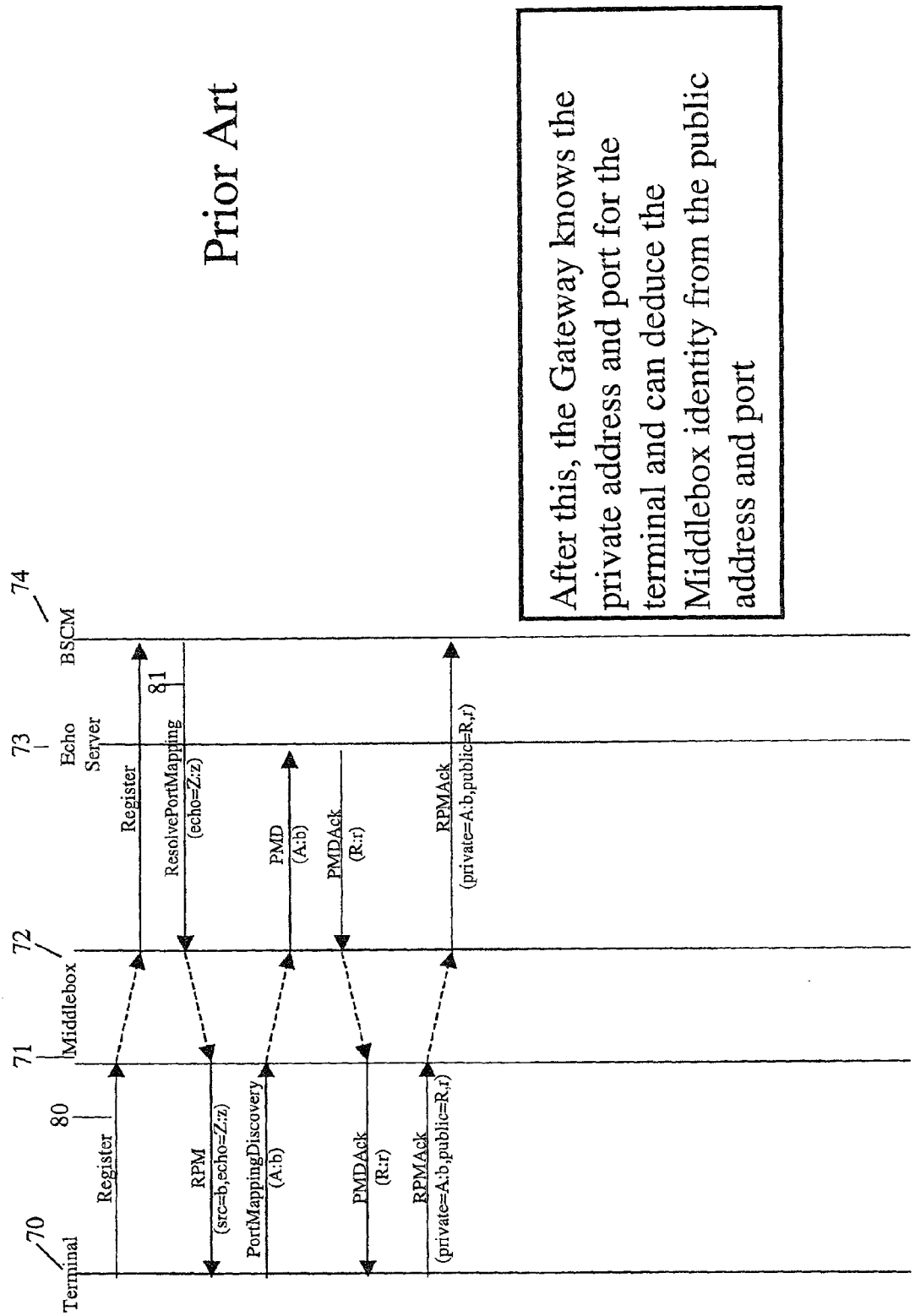
FIG. 8 is a message sequence chart showing a discovery algorithm according to the prior art.

The middlebox-identity-providing nodes either have pre-configured middlebox identity information or use a network analysis method to determine the information automatically. This type of automatic method will be referred to herein as "discovery". Any suitable discovery method can be used as known in the art. For example, FIG. 8 is a message sequence chart for a preferred discovery method. FIG. 8 is discussed in more detail below.

The middlebox-identity-providing node sends the middlebox identity information to the middlebox control node. Any suitable identifier can be used for the middlebox identity. For example, a fully qualified domain name (FQDN), an internet protocol (IP) address or any other suitable unique identifier. In the case that the middlebox is a NAT the identity may be the IP address of the public side of the NAT. More detail about how the middlebox identity information is sent is given below in the section headed "sending middlebox identity information". In the case that an FQDN is used, that FQDN may be extended to include more information about the middlebox. This additional information may be carried in a separate field of the control message if the FQDN method is not used. For example, in some embodiments one particular "middlebox" node effectively provides two or more middleboxes. That is, the node is arranged to act as two or more independent middleboxes. In such a case additional information is required to specify not only the identity of the middlebox node but also the identity of the particular middlebox functionality within that node. This additional information would then also be added to the control message.

FIG. 2 is a schematic diagram of a communications network incorporating middlebox-identity-providing nodes according to an embodiment of the present invention. FIG. 2 is similar to FIG. 1 and identical reference numbers are used to refer to identical items in those figures. In the example shown in FIG. 2, address realm D3 contains two gateway nodes, 20, 21 which are connected to the call server 18 (possibly indirectly). Those gateway nodes 20, 21 act as the middlebox-identity-providing nodes. That is they have information about middleboxes 1 and 2 either through provisioning (pre-configured information), by discovery or by any other suitable means.

Figure 3:
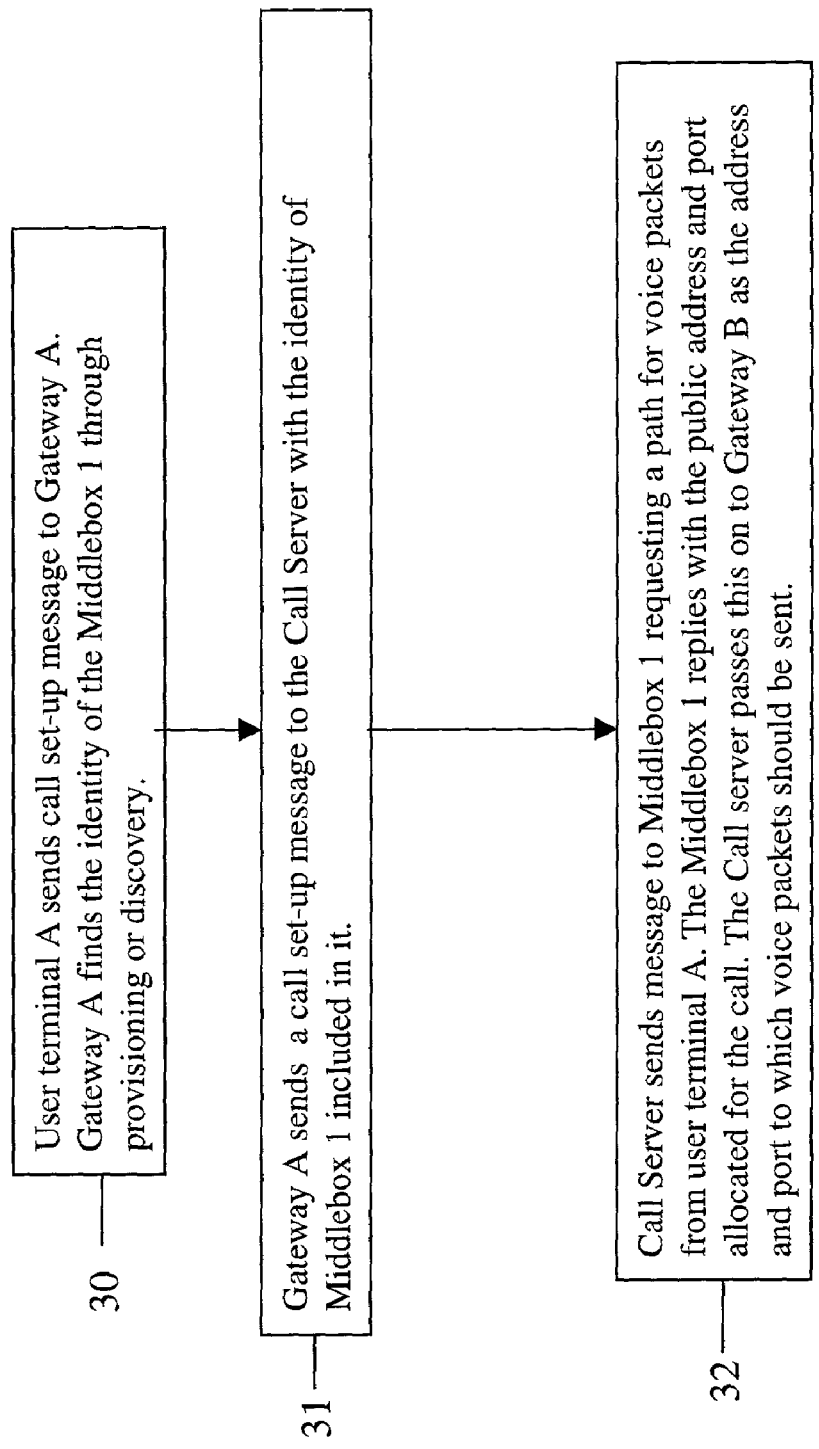
FIG. 3 is a flow diagram of a method of setting up a call using the communications network of FIG. 2.

Consider the situation in which middleboxes 1 and 2 are NATs and it is required to set up a call from user terminal A 14 to user terminal B 16. A method is followed as indicated in FIG. 3. User terminal A 14 sends a call set-up message to gateway A 20. For example, this is achieved because user terminal A knows the address of gateway A in advance and is arranged to forward all call set-up messages to gateway A. The call set-up message contains details of the entity which originated it, i.e. user terminal A in this example.

Gateway A then finds the identity of the middlebox associated with the originator of the call set-up request (i.e. user terminal A and middlebox 1). For example, Gateway A achieves this by checking its pre-configured middlebox information or by using a discovery method (see box 30 of FIG. 3).

Gateway A next forwards the call set-up message to the call server, or middlebox control node, having first added the identity of middlebox 1 to that control message (see box 31 of FIG. 3). The call server 18 receives the call set-up message and obtains the middlebox identity. Using this identity information the call server is able to send control messages to middlebox 1, for example, to set up an appropriate binding for the call. In the example shown in FIG. 2 a binding is obtained for middlebox 1 and passed on from the call server to gateway B (see box 32 of FIG. 3). Gateway B then forwards the binding information for middlebox 1 on to user terminal B. Media can then be sent from user terminal B to user terminal A. The same process operates in the other direction in order to set-up a media path from user terminal A to user terminal B. User terminal B then sends its private address to gateway B. Gateway B determines the identity of the middlebox associated with user terminal B (i.e. of middlebox 2) and sends that identity to the call server. The call server then instructs middlebox 2 to create a binding to user terminal B, and user terminal A is informed of the results. Media can then be sent from user terminal A to user terminal B.

Figure 4:
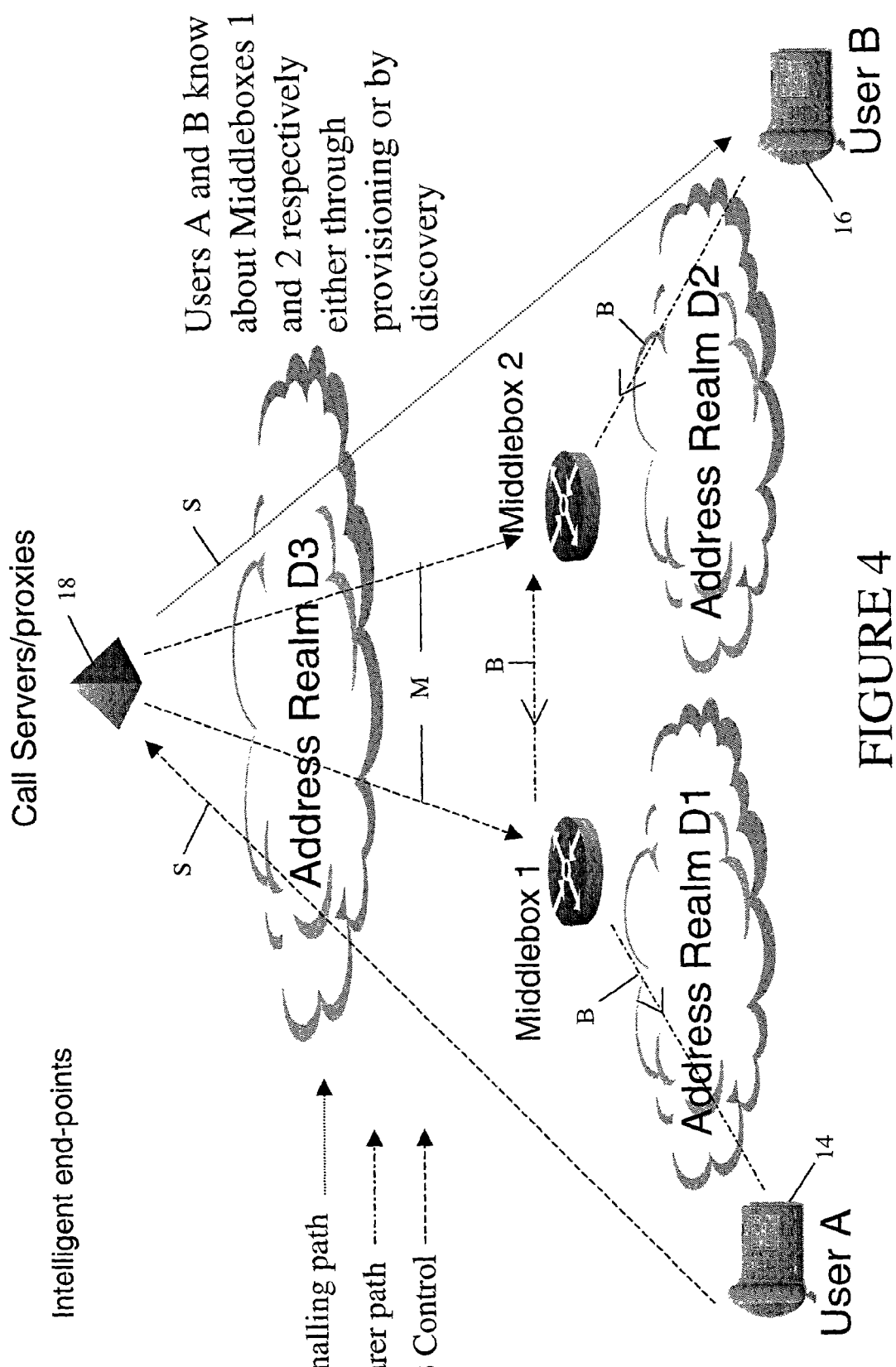
FIG. 4 is a schematic diagram of a communications network with user terminals that provide middlebox-identity-providing functionality.
Figure 5:
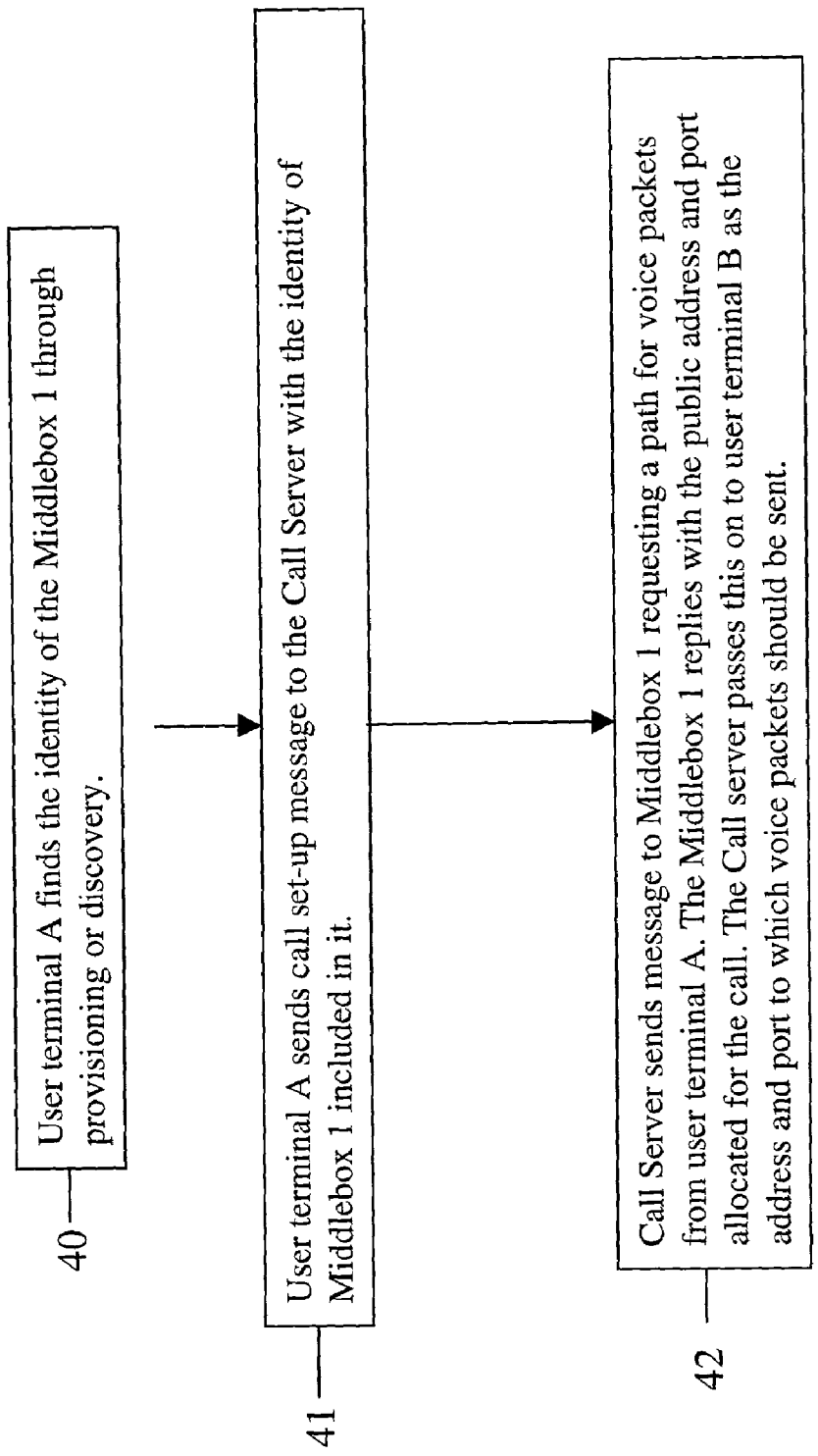
FIG. 5 is a flow diagram of a method of setting up a call using the communications network of FIG. 4.

In another embodiment, the middlebox-identity-providing nodes are the user terminals themselves. This is illustrated in FIGS. 4 and 5. FIG. 4 is similar to FIGS. 1 and 2 and identical reference numbers are used for the same items. However, the user terminals 14, 16 in FIG. 4 are different from those of FIGS. 1 and 2 because they have middlebox-identity-providing functionality.

Consider the case that a call is to be set-up from user terminal A to user terminal B and the middleboxes are NATs. User terminal A finds the identity of its associated middlebox, for example, by using pre-specified information or by using a discovery algorithm (see box 40 of FIG. 5). User terminal A then sends a call set-up message to the call server 18 containing the identity of middlebox 1. Using this identity information the call server is able to send control messages to middlebox 1 to create a binding and the results of this binding are sent back to the call server. The call server then forwards this to user terminal B. Similarly, middlebox 2's address is obtained from user terminal B, and used by the call server to instruct middlebox 2 to create a suitable binding. The results of that binding are then sent to user terminal A.

Figure 6:
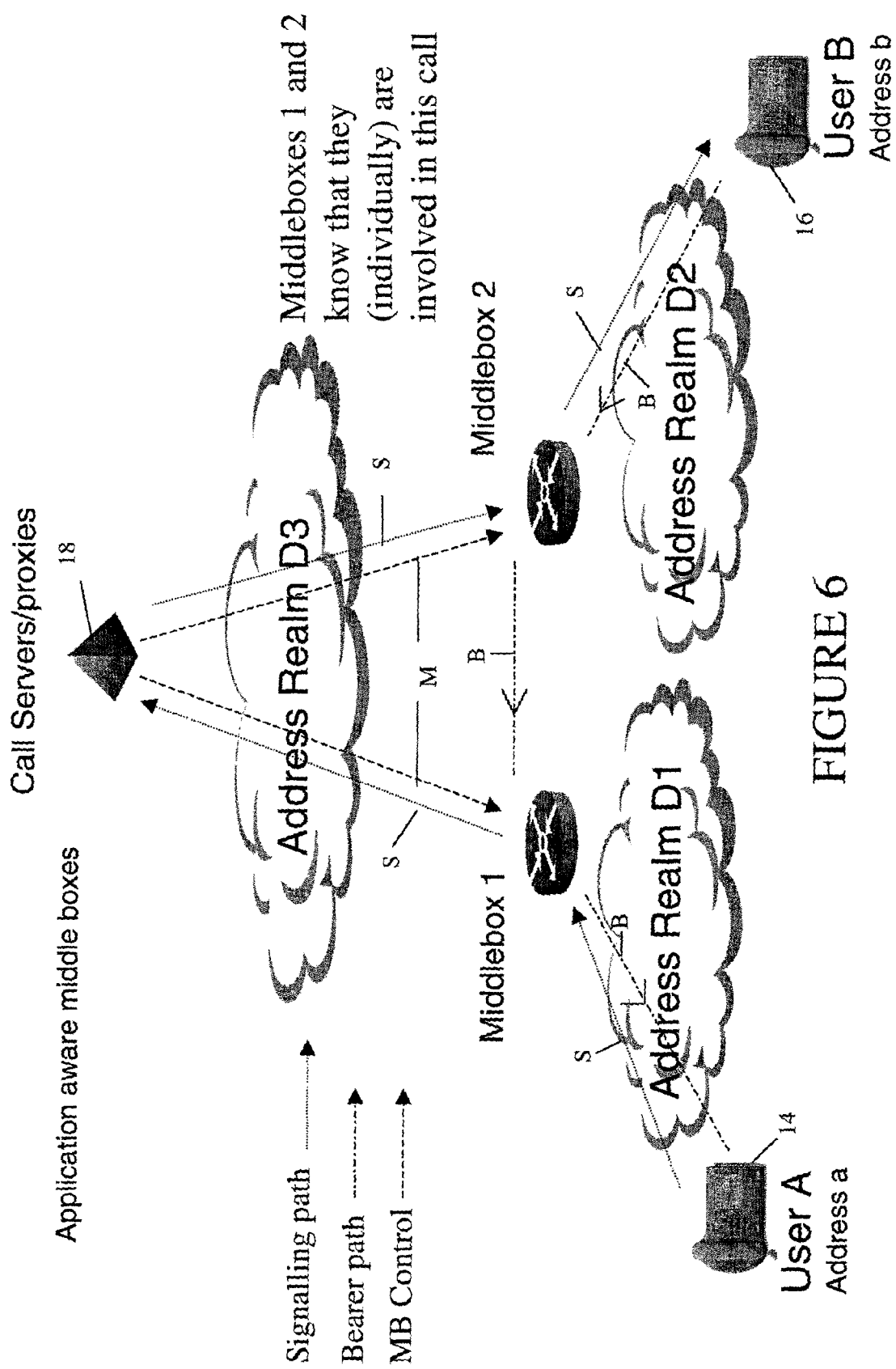
FIG. 6 is a schematic diagram of a communications network with middleboxes that provide middlebox-identity-providing functionality.
Figure 7:
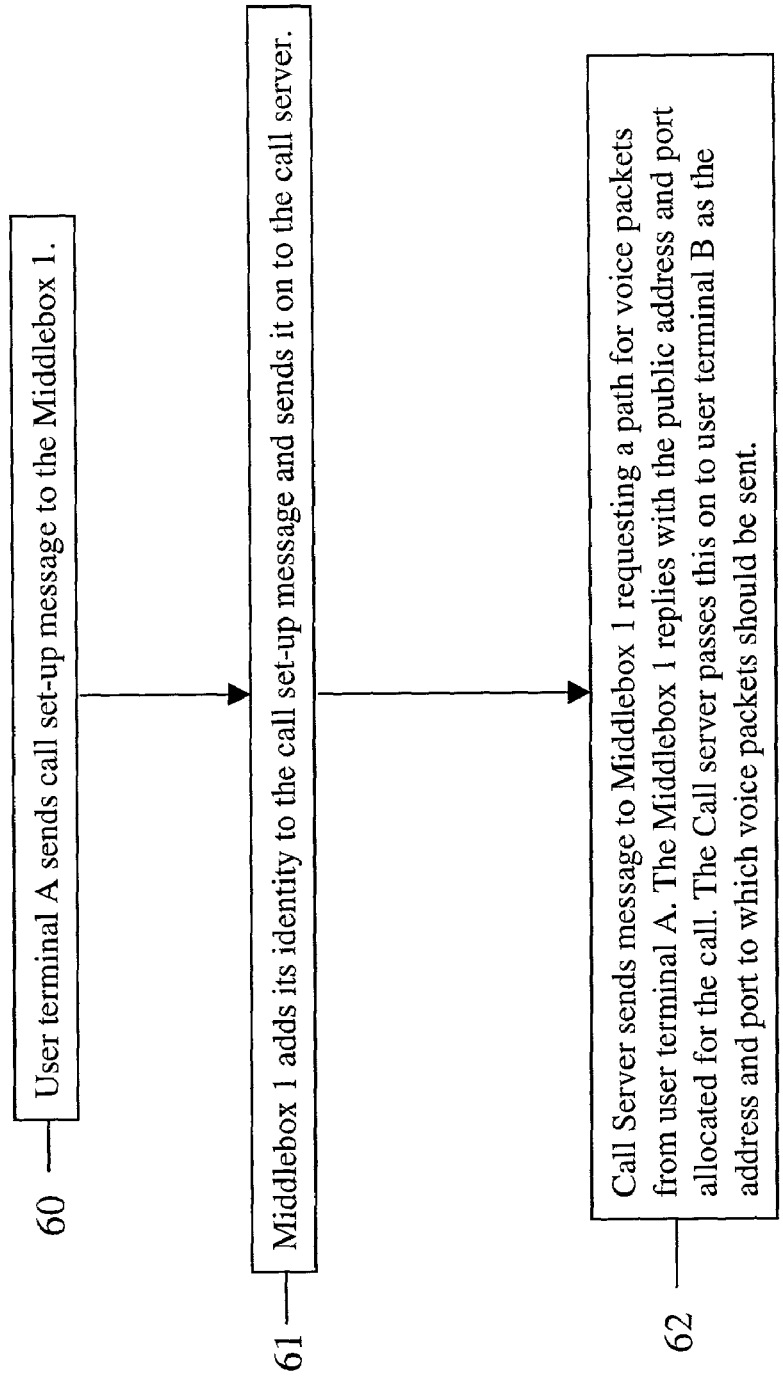
FIG. 7 is a flow diagram of a method of setting up a call using the communications network of FIG. 6.

In another embodiment the middlebox-identity-providing nodes are the middleboxes themselves. This is illustrated in FIGS. 6 and 7. FIG. 6 is similar to FIG. 4 and identical reference numbers are used for the same items. However in FIG. 6, the middleboxes 1 and 2 have the identity-providing functionality rather than the user terminals.

Consider again the situation in which it is required to set-up a call between user terminal A and user terminal B and where the middleboxes comprise NATs. In this case user terminal A sends its call set-up request to middlebox 1 on route to the call server 18. Middlebox 1 adds its own identity to the call set-up message and forwards it to the call server (see boxes 60 and 61 of FIG. 7). The call server then instructs the middlebox 1 to set up a binding as in the examples of FIGS. 3 and 5. The results of the binding are sent to the call server which passes them on to user terminal B. Similarly, the call server obtains middlebox 2's address from middlebox 2 and instructs it to set up a binding. The results of that binding are sent to the call server and from there to user terminal A.

In these examples the situation of call set-up is considered. However the invention is equally applicable to other tasks in which middlebox control is required such as allowing non-call related data paths as mentioned above. Other examples involve bringing up media streams during a call (e.g. for video, file transfer, whiteboard, application sharing) where those media streams may potentially take a different media path from the main call. Also, the examples discussed above all involve using NATs. However the middleboxes may instead be firewalls, quality of service devices or any other suitable type of middlebox.

Sending the Middlebox Identity

The middlebox identity is preferably sent by incorporating it into a call signalling message such as a call set-up request. For example, it may be added as a new parameter in the call signalling message or carried as an optional IP header. In a preferred embodiment the identity information is added as a new parameter in a session description protocol (SDP) message as follows:

v=0
c=IN IP4 47.86.54.32
m=audio 345 RTP/AVP 0
a=mbid: FQDN com.Nortel.middlebox1.logicalb
Where mbid is a new attribute to be defined as:
Middlebox-ID-attribute="a=mbid:" id-type mbid-tag
id-type=[FQDN|IP4|token]
mbid-tag=token The v=, c=and m=lines are standard SDP. The value of v defines the protocol version being used whilst the value of c is an IP version 4 address for one end of the connection. The value of m in this case specifies that the media will be audio, sent or received as RTP in payload format o (G711U) to/from port 345. In SDP, an a=line is used to give attribute information. There may be several a=lines for different attributes or for the same attribute. The attribute is given by the string following the a=, in this case mbid.

The definition given here is in Backus-Naur Form (BNF) as described in RFC-2234, and allows a suitable SDP parser to verify the a=mbid line as valid SDP.

The mbid attribute is defined as having two fields: the id-type and the mbid tag. The id-type is defined as being either the string FQDN, the word IP4, or some other string (token), and the mbid-tag is defined as a string (token).

Use of such a new SDP attribute or parameter needs to be registered with the IANA (Internet Assigned Numbers Authority). Also, the middlebox-identity-providing node is arranged to be able to add such information to the control message. In the case that a new SDP attribute is used, then the middlebox-identity-providing node is required to be "application aware", that is, to have capability to make changes to the body of the control messages. Another option is to use an IP header as mentioned above. The advantage of this is that the middlebox-identity-providing node does not need to be "application aware"; rather it simply adds the IP header. The content of the body of the control message could even be encrypted in this case.

The middlebox identity can be added to the control signalling or messages at any node that the signalling passes from the user terminal or client upwards to the call server. For example, we have discussed using the client itself, the middlebox, and a gateway with respect to FIGS. 2, 4 and 6.

In some embodiments more than one middlebox is involved in the communications path. For example, the call may pass through a firewall and then a NAT. In that case, the middlebox identity information for each middlebox involved is added in sequence to the control message. For example, in the SDP example above, several a=mbid lines could be added to the message. Thus, either one middlebox-identity-providing node adds several middlebox identifiers in sequence, or several middlebox-identity-providing nodes each add a middlebox identifier. Thus the ability to chain middlebox identity information is achieved.

Discovery Algorithm

As mentioned above, the middlebox-identity-providing node can use any suitable discovery algorithm to automatically obtain information about the identity of middleboxes. This provides the advantage that it is not necessary to pre-configure the middlebox-identity-providing node with middlebox-identity information.

A preferred example of a discovery algorithm according to the prior art is now discussed with reference to FIG. 8 which is a message sequence chart. The vertical lines in FIG. 8 represent nodes in the communications network. Line 70 represents a user terminal, line 71 represents a port of a middlebox connected to a first address realm of the user terminal, line 72 represents a port of the middlebox connected to a different second address realm and line 73 represents an echo server in the second address realm. Line 74 represents a middlebox-identity-providing node in the second address realm. In this example line 74 represents a Business Services Channel Manager (BSCM) as commercially available from Nortel Networks. Line 75 represents a middlebox control node and call server which in this example is a Communications Server as available commercially from Nortel Networks.

The arrows in FIG. 8 represent control signal messages between nodes in the communications network, with the relative positions of the arrows vertically on the page representing the sequence of those messages in time.

Consider the situation in which the terminal 70 requires to set up a call. The terminal sends a registration message 80 to the middlebox 71, 72 which forwards that message to the BSCM 74. The BSCM then sends a resolve port mapping message 81 through the middlebox to the terminal. This message contains the address and port of the echo server (Z:z) (where to send the port mapping discovery message to). The terminal sends a Port Mapping Discovery message containing the terminals address and port (A:b) through the middlebox to the echo server. In passing through the middlebox, the address and port of the terminal is replaced with the address and port of the NAT bind (R:r) in the source address. The echo server replies to the message with a PMDAck containing this address and port (R:r). On receiving this, the Terminal sends an RPMAck to the original Resolve Port Mapping message back to the BSCM with the address and port of the Terminal (A:b) and the address and port of its public IP (R:r). The BSCM knows that the address and port R:r relates to a given middlebox, and hence the middlebox is discovered.

In a preferred example, the middlebox control node uses middlebox communication (MIDCOM) protocol (as defined by the Internet engineering task force, IETF MIDCOM working group) in order to control the middleboxes. One advantage of the present invention is that the middlebox-identity-providing node does not need to have the ability to operate a protocol such as MIDCOM for controlling the middleboxes. The MIDCOM protocol is described in the following Internet Drafts of the IETF which are incorporated herein by reference:

Middlebox Communication Architecture and Framework, October 2001
Middlebox Control (MIDCOM) protocol architecture and requirements, July 2001
MIDCOM Scenarios, May 2001

Any range or device value given herein may be extended or altered without losing the effect sought, as will be apparent to the skilled person for an understanding of the teachings herein.

A range of applications are within the scope of the invention. These include situations in which it is required to control middleboxes and/or to provide middlebox identity information to a middlebox control node.

The invention claimed is:

1. A method of controlling one of a plurality of middleboxes in a communications network, each of the middleboxes being connected to a plurality of entities in a respective one of a plurality of address realms of the communications network, said method comprising the steps of:
   (i) receiving a control message at a middlebox-identity-providing node in the communications network, said control message comprising information about one of the entities in the communications network;
   (ii) using the middlebox identity providing node to determine the identity of a first middlebox connected to said one entity in its respective one of the plurality of address realms;
   (iii) sending said identity to a middlebox control node in the communications network in order to enable said middlebox control node to send middlebox control messages to said first middlebox, said middlebox control node being located in a different address realm than that of said one of the entities;
   and wherein the middlebox-identity-providing node is separate from the middlebox control node and is located in a control signal path from said one of the entities to the middlebox control node.

2. A method as claimed in claim 1 wherein said step (iii) of sending said identity comprises adding said identity to a control message and sending said control message.

3. A method as claimed in claim 2 wherein additional information is also added to the control message.

4. A method as claimed in claim 2 wherein said control message is a session description protocol (SDP) message.

5. A method as claimed in claim 4 wherein said identity is added to an SDP message using a pre-specified SDP attribute.

6. A method as claimed in claim 1 wherein said control message is a call set-up message and said method further comprises sending middlebox control messages to said first middlebox in order to set-up a call from said one entity to another entity connected to a second middlebox in the communications network.

7. A method as claimed in claim 6 wherein said second middlebox is connected to a plurality of entities in a second address realm different from the first address realm of the entities connected to the first middlebox.

8. A method as claimed in claim 7 wherein the middlebox control node is within a third address realm different from the first and second address realms.

9. A method as claimed in claim 8 wherein the third address realm is public.

10. A method as claimed in claim 9 wherein the first and second address realms are private.

11. A method as claimed in claim 1 wherein the middlebox-identity-providing node is selected from: one of the middleboxes; a gateway in the communications network; said one entity, being a user terminal in the communications network; and a gateway comprising a business services channel manager (BSCM).

12. A method as claimed in claim 6 wherein said call passes through two or more middleboxes and wherein information about the identity of each such middlebox is added to said control message.

13. A method as claimed in claim 1 wherein said middlebox control node is a MIDCOM agent.

14. A method as claimed in claim 1 wherein each of the middleboxes is selected from a firewall, a network address translator (NAT), and a quality of service device.

15. A method as claimed in claim 1 wherein said middlebox-identity-providing node is arranged to determine the identity of the first middlebox by using pre-specified information.

16. A method as claimed in claim 1 wherein said middlebox-identity-providing node is arranged to determine the identity of the first middlebox by automatically analysing the communications network.

17. A communications network comprising:
(i) a plurality of middleboxes, each connected to a plurality of entities in a respective one of a plurality of address realms of the communications network;
(ii) a middlebox-identity-providing node arranged to receive a control message comprising information about one of the entities and to determine the identity of a first middlebox connected to said one entity in its respective one of the plurality of address realms;
(iii) a middlebox control node arranged to receive the determined identity of the first middlebox in order to enable said middlebox control node to send middlebox control messages to said first middlebox; said middlebox control node being located in a different address realm than that of said one of the entities, said middlebox-identity-providing node being separate from the middlebox control node and being located in a control signal path from said one of the entities to the middlebox control node.

18. A communications network as claimed in claim 17 wherein said middlebox-identity-providing node is further arranged to send said determined identity to the middlebox control node as part of a control message.

19. A communications network as claimed in claim 18 wherein said control message is a session description protocol message.

20. A middlebox control node arranged to control a plurality of middleboxes in a communications network, said middlebox control node comprising:
(i) an input arranged to receive a control message comprising information about the identity of one of the middleboxes;
(ii) a processor arranged to issue messages to the identified middlebox in order to control it; such that in use the middlebox control node is able to control the identified middlebox without the need to maintain its own store of information about the identities of the middleboxes and without the need to maintain its own discovery mechanism to discover the identities of the middleboxes.

21. A middlebox-identity-providing node for use in a communications network comprising a plurality of middleboxes, said middlebox identity providing node comprising:
(i) an input arranged to receive a control message comprising information about one of a plurality of entities in the communications network;
(ii) a processor arranged to determine the identity of a first middlebox connected to said one entity in a respective one of a plurality of address realms;
(iii) an output arranged to send said identity to a middlebox control node in the communications network, said middlebox control node being located in a different address realm than that of said one of the entities; and wherein said middlebox-identity-providing node is arranged to be located in a control signal path from said one of the entities to the middlebox control node.

22. A computer readable medium comprising program instructions arranged to control a middlebox control node, said middlebox control node comprising an input arranged to receive a control message comprising information about the identity of one of the middleboxes; and a processor arranged to issue messages to the identified middlebox in order to control it; such that in use the middlebox control node is able to control the identified middlebox without the need to maintain its own store of information about the identities of the middleboxes and without the need to maintain its own discovery mechanism to discover the identities of the middleboxes;
the computer program comprising program code executable by the processor in order to enable the middlebox control node to:
receive a control message comprising information about the identity of one of the middleboxes; and to
issue messages to the identified middlebox in order to control it.

23. A non-transitory computer readable medium comprising program instructions arranged to control a middlebox-identity-providing node, said middlebox identity providing node comprising an input arranged to receive a control message comprising information about one of a plurality of entities in the communications network; a processor arranged to determine the identity of a first middlebox connected to said one entity in a respective one of a plurality of address realms; and
an output arranged to send said identity to a middlebox control node in the communications network, said middlebox control node being located in a different address realm than that of said one of the entities; and wherein said middlebox-identity-providing node is arranged to be located in a control signal path from said one of the entities to the middlebox control node;
the computer program comprising program code executable by the processor in order to enable the middlebox identity-providing node to:
receive a control message comprising information about one of a plurality of entities in the communications network;
determine the identity of a first middlebox connected to said one entity; and
send said middlebox identity to a middlebox control node in the communications network.

24. A method as claimed in claim 1, wherein the first middlebox is arranged to act as two or more independent middleboxes and wherein the step of providing the identity of the first middlebox to the middlebox control node comprises providing the identity of the first middlebox and the identity of a particular middlebox functionality relating to one of said two or more independent middleboxes that is to be used.

25. A method as claimed in claim 1, wherein the middlebox identity providing node uses a discovery algorithm to automatically obtain information about the identity of middleboxes in the communications network.

26. A method as claimed in claim 1, wherein the middlebox identity providing node uses a discovery algorithm to automatically obtain information about the identity of middleboxes in the communications network prior to one of the receiving and determining steps.

* * * * *